United States Patent [19]

Malmberg et al.

[11] 4,317,324

[45] Mar. 2, 1982

[54] SYSTEM FOR MOTOR-DRIVEN RIDE-ON LAWN MOWERS

[75] Inventors: Gunnar Malmberg, Tranås; Roger Andersson, Gränna; Kjell Pettersson, Tranås, all of Sweden

[73] Assignee: Stiga AB, Tranås, Sweden

[21] Appl. No.: 163,852

[22] Filed: Jun. 27, 1980

[30] Foreign Application Priority Data

Jun. 29, 1979 [SE] Sweden ................ 7905741

[51] Int. Cl.³ .................................... A01D 69/10
[52] U.S. Cl. ........................... 56/11.3; 56/DIG. 22
[58] Field of Search ............... 56/DIG. 22, 11.3, 6; 188/366, 329, 330, 332

[56] References Cited

U.S. PATENT DOCUMENTS

| | | | |
|---|---|---|---|
| 429,573 | 6/1890 | Keller | 188/166 |
| 1,952,324 | 3/1934 | Ljnngstrom | 188/330 |
| 1,964,185 | 6/1934 | St. James | 188/330 |
| 2,038,207 | 4/1936 | Cunningham et al. | 188/332 |
| 2,991,612 | 7/1961 | Holmes | 56/6 |
| 3,228,177 | 1/1966 | Coates | 188/166 |
| 3,229,452 | 1/1966 | Hasenbank | 56/11.3 |
| 3,466,855 | 9/1969 | Hanson et al. | 56/DIG. 22 |
| 3,516,233 | 6/1970 | Johnson et al. | 56/6 |
| 3,771,296 | 11/1973 | Sorenson et al. | 56/DIG. 22 |

*Primary Examiner*—Paul J. Hirsch
*Attorney, Agent, or Firm*—Beveridge, DeGrandi & Kline

[57] ABSTRACT

The invention relates to a system for motor-driven ride-on lawn mowers of the type where the cutting assembly is placed in front of the front axle, in which the front wheels are adapted as driving and braking wheels and the rear wheels as steering wheels. The new feature is that the brake mechanism acting upon the front wheels is provided with a modulation apparatus which, independently of the power exerted by the driver on the brake pedal or the like, prevents the braking power acting upon the wheels from reaching the amount where the wheels would be locked.

7 Claims, 3 Drawing Figures

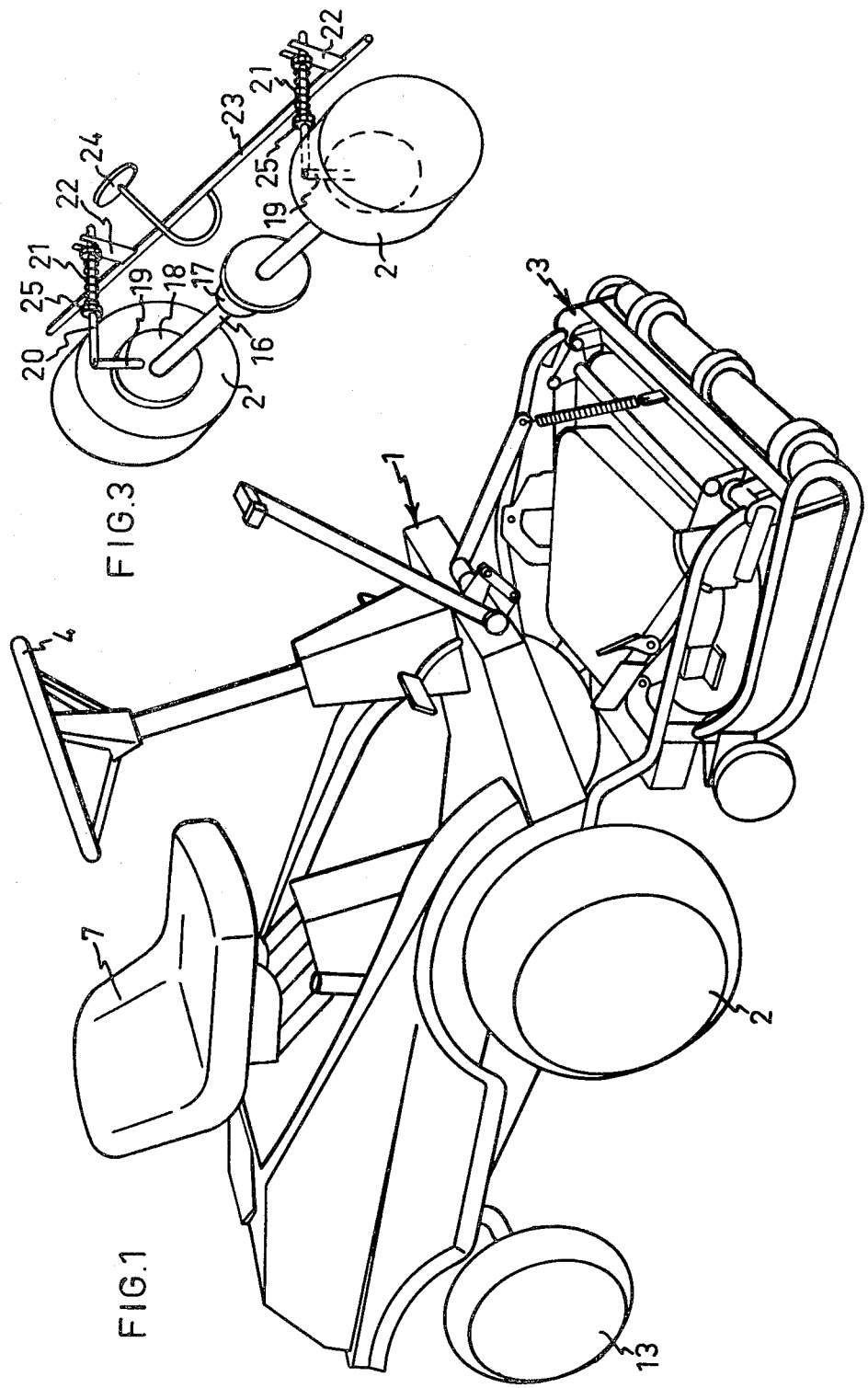

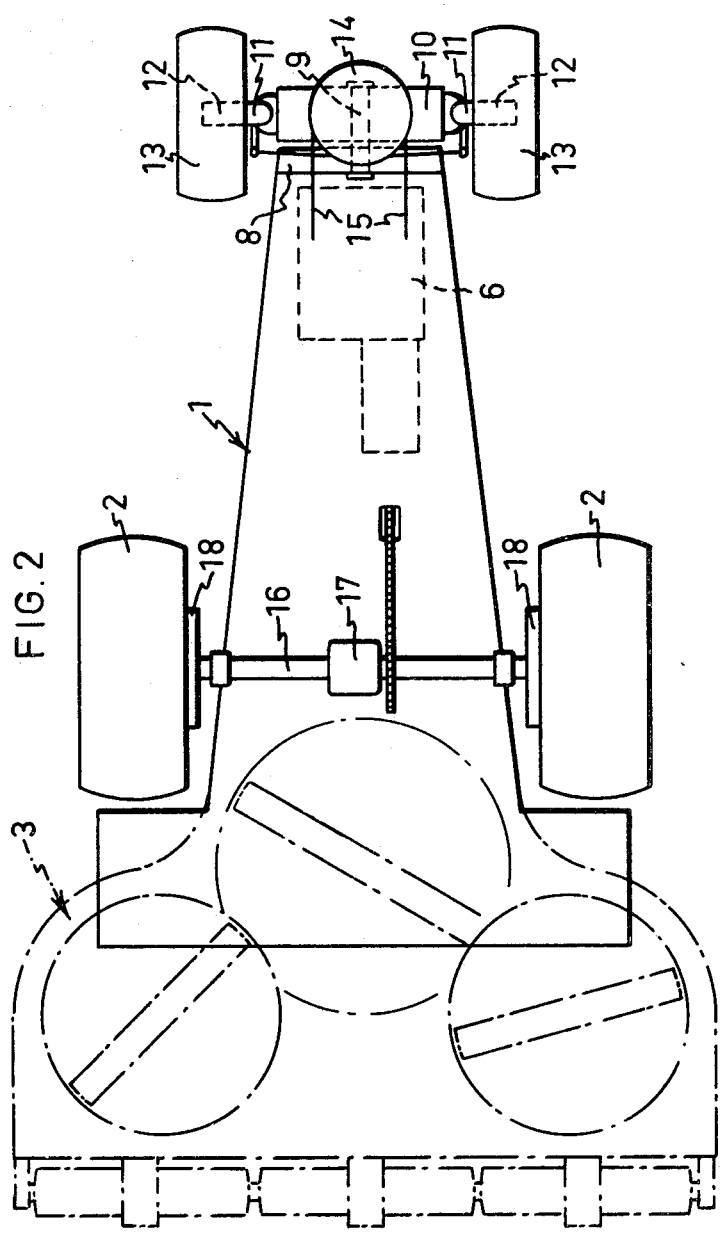

SYSTEM FOR MOTOR-DRIVEN RIDE-ON LAWN MOWERS

This invention relates to a system for motor-driven lawn mowers, and, more particularly, a so-called ride-on lawn mower, comprising a frame, drive wheels, a drive motor, a cutting assembly and a driver's seat with steering, brake and control mechanisms, in which the cutting assembly is located at the front of the mower and the fore wheels, as counted in the driving direction, are non-steerable and arranged in the frame as brakable driving wheels, while the rear wheels are adapted to form steering wheels, and in which the motor as well as the driver's seat are localized behind a vertical plane along the driving front axle while the major part of the cutting assembly is localized in front of said plane.

Prior art lawn mowers of this type has a wheel base which is long in relation to the size of the machine and this is primarily to obtain the stability required. The long wheel base is applied to front wheel driving and braking in order to reduce the risk of overturning in forward direction when braking, especially while driving downhill.

The long wheel base of the prior art lawn mowers entails, however, several obvious disadvantages. The long wheel base impairs the mobility of the mower and gives too large a turning radius. The increase of the size of the lawn mower, conditioned by the long wheel base, makes the mower heavier and thus more difficult to steer especially on soft ground.

A main object of the invention is to provide a ride-on lawn mower which has maximum operability as far as the cutting assembly is concerned, has a short wheel base and has the lowest possible weight but nevertheless the stability required for driving also in hilly country or on rough ground.

The stability problem arises primarily in connection with braking and especially when the ride-on mower is driven with the cutting assembly lifted up. Also in downhill mowing, when the gravity center of the mower approaches the vertical plane through the front axle, there is a risk that braking will result in overturning in forward direction.

To avoid the risk of such forward overturning it is suggested according to this invention that the front wheels of the ride-on mower be provided with means to prevent locking of the front wheels during braking.

Non-locking brakes have certainly been proposed before for road vehicles but the solutions arrived at in that connection presuppose quite different operation conditions and speeds than those concerned with the type of ride-on mowers of present interest. In cars and other road vehicles the means preventing locking of the wheels are as a rule designed so that they will sense whether a wheel tends to be or is blocked and will thus reduce the braking power so that the wheel, under the influence of the mass power of the vehicle, will begin to roll again. Such a means, which momentaneously disables the brake of one wheel, cannot be utilized in a ride-on lawn mower since the overturning accident is a fact from the very moment a first locking of the wheels takes place, because as soon as the front wheel are locked the mower, under the influence of the inertia, will continue in forward direction and turn about a "pivot axis" passing through the points of contact of the wheels with the ground.

The forward overturning takes place very rapidly and occurs practically at the same moment as the wheels are locked. The driver has as a rule no possibility whatsoever of preventing forward overturning since the time at his disposal is too short to permit any steps to be taken.

According to the invention the risk of overturning is eliminated in that the brake mechanism for the front wheels are provided with control means putting an upper limit to the braking power applicable by means of the brake pedal. Independently of the force with which the brake pedal is pressed down, the brake shoes or the like engaging the brake drums or the like of the wheels will thus be pressed with a force which cannot exceed a predetermined maximum value.

An example of embodiment of a ride-on lawn mower according to the invention will be described below with reference to the accompanying drawings, in which:

FIG. 1 is a schematical view of a preferred embodiment as seen diagonally from the side;

FIG. 2 is a schematical view on a larger scale showing the frame of the same lawn mower, as seen from below, in which the position of the cutting assembly is indicated by dash lines; and FIG. 3 is a schematical perspective view showing the construction of the brake system adapted for modulated braking.

The ride-on lawn mower is built up on a generally T-shaped frame 1 which, at is transversely extending front portion, is provided with bearings for front wheels 2 and attachments for a cutting assembly 3, indicated by dash lines, which is vertically adjustable and can be raised for transporting purposes.

Mounted on the frame are a steering gear with a hand steering wheel 5, a driver's seat 7 and a drive motor 6 with power transmission means and operating means. Also attached to the frame is a carriage body concealing the frame and motor and constituting mudguards or fenders.

Arranged in the rear portion of the frame is a downwardly extending projection 8 in which there is mounted a pivot 9 oriented in the longitudinal direction of the frame 1.

A rear axle assembly 10 is pivotally mounted on the pivot 9 so that it can turn about the axis of the pivot to make it possible for the rear wheels to maintain engagement with the ground also when this is uneven.

The rear axle assembly 10 is box-shaped and built up of heavy parts so that it will form a counter-weight. The rear wheels 13 are mounted on the rear axle in the usual way by means of generally vertical spindle bolts 11 connected with horizontal axle pins 12. The rear wheels 13, which are steering wheels, are connected with a turntable 14 which is mounted on the rear axle and connected, in its turn, by wires 15 to a pulley arranged on the hand steering wheel bar. The steering wheels are connected with the turntable 14 in such a way that, when turning, they will run in the usual way along appropriate arcs of a circle to produce the intended steering effect. As the steering wheels 13 are situated entirely below the frame the steering deflections obtained are great.

The wheels 2 at the front axle 16, which are coupled together by means of a differential 17, are provided with brake drums 18. The brake shoes at these drums are acted upon by means of arms 19 (FIG. 3).

A brake pedal actuator 24 is operatively connected to the brakes by a linkage which includes the elements 19-23. To prevent too strong an action on the brakes, which would result in the wheels being locked and entail a risk of overturning, there are push rods 20, provided with resilient springs 21, acting on the respective arm 19. The push rods 20 are intended to be acted upon by control arms 22 arranged on a transverse shaft 23 which is turned upon actuation of the brake pedal 24. Instead of push rods it is of course possible to use draw bars.

The movement of the shaft 23 and thus the arms 22 is limited and as the arms can only turn to a limited extent, the springs 21 cannot be completely compressed. Provided on the push rods 20 are adjustable nuts 25 by means of which the spring force can be controlled.

The adjustment of the springs should be such as to allow a substantially constant spring force to be exerted during the pedal movement up to a predetermined point. As the power from the brake pedal is transmitted to the brakes via the springs 21, which give way upon reaching the predetermined point, the brake shoes or the like are prevented from being pressed so heavily against the brake drums that the wheels would be locked. Locking of the wheels must be avoided since this would involve a risk of overturning in forward direction, especially when braking in driving down steep slopes.

In a hydraulic brake system the mechanical power transmission means between brake pedal and brake drums are dispensed with and replaced by conventional components.

Instead of the springs 21 causing modulation and putting a limit to the application power of the brakes, a hydraulic system is provided with a maximum pressure valve which, on reaching the predetermined highest brake conduit pressure allowed, opens towards the hydraulic medium container.

A displacement of the center of gravity of the lawn mower in rearward and downward direction, which is essential from the point of view of stabilization, is obtained due to the specific construction of the lawn mower, including driving front wheels and, behind these wheels, a motor located close to the rear axle and a driver's seat, together with the arrangement of the heavy, low-positioned rear axle directly supported by the rear wheels and loading the frame at the rear. Moreover, as the brakes have been adapted for modulated non-locking braking, the risk moment otherwise associated with brakable front wheels is entirely eliminated.

What we claim and desire to secure by Letters Patent is:

1. A motor driven ride-on lawnmower which, when braked, resists overturning in a forward direction, comprising,
   a frame,
   a driver's seat,
   a cutting assembly at the front of the mower,
   a pair of rear wheels which are steerable with high turnability, steering controls connected to said rear wheels,
   a forward wheel assembly on said frame which includes a front axle and front wheels, said front wheels being nonsteerable,
   a drive motor connected to the front wheels whereby said front wheels serve as the drive wheels for the mower,
   said driver's seat and said drive motor being located behind a vertical plane through the front axle,
   said cutting assembly having a major portion thereof located forwardly of said vertical plane through the front axle,
   brake means operable on the front wheels,
   a brake actuator member which is operable by the operator of the mower,
   linkage means for transmitting forces from the brake actuator to the brake means,
   said linkage means including resilient means which has spaced portions thereof operatively connected respectively to the brake actuator and the brake means, said resilient means having a resiliency which puts an upper limit on the force transmitted to the brake means by the linkage, said upper limit having a magnitude so as to prevent locking of the front wheels and any forward overturning of the mower caused thereby.

2. A mower as claimed in claim 1, wherein the brake actuator is a pedal, said resilient means for putting an upper limit to the applicable braking power includes a pair of springs arranged in the linkage means between the brake pedal and the brakes means and adapted to yield when an excessive actuating force is applied to the brake pedal.

3. A mower as claimed in claim 2, including means for adjusting the tension of the springs.

4. A mower as claimed in claim 2, wherein separate linkages and their respective springs are provided at each wheel.

5. A mower as claimed in claim 3 or claim 4, wherein the springs have a substantially constant resistance within the length variation required for braking.

6. A mower as claimed in claim 3, wherein the adjusting means includes a screw means.

7. A mower as claimed in claim 1, having a heavy rear axle which acts as a counter-weight to displace the center of gravity of the mower rearwardly and downwardly, a longitudinal shaft pivotally connecting the rear axle to the frame, said rear wheels being connected to the rear axle.

* * * * *